US012806670B2

(12) United States Patent
Smith, Jr.

(10) Patent No.: US 12,806,670 B2
(45) Date of Patent: Nov. 24, 2026

(54) BUCKET CLEANING SYSTEM

(71) Applicant: Kenneth W. Smith, Jr., Argyle, TX (US)

(72) Inventor: Kenneth W. Smith, Jr., Argyle, TX (US)

( * ) Notice: Subject to any disclaimer, the term of this patent is extended or adjusted under 35 U.S.C. 154(b) by 413 days.

(21) Appl. No.: 18/518,188

(22) Filed: Nov. 22, 2023

(65) Prior Publication Data

US 2025/0162005 A1 May 22, 2025

Related U.S. Application Data

(60) Provisional application No. 63/428,333, filed on Nov. 28, 2022.

(51) Int. Cl.

*B08B 13/00* (2006.01)
*B08B 9/00* (2006.01)
*E02F 1/00* (2006.01)

(52) U.S. Cl.

CPC ................ *B08B 13/00* (2013.01); *B08B 9/00* (2013.01); *E02F 1/00* (2013.01)

(58) Field of Classification Search

CPC .......... A47L 13/02; A47L 13/08; A47L 25/00; B08B 1/16; B08B 1/165; B08B 13/00; E02F 1/00; E02F 3/14; E02F 3/141; E02F 3/144

See application file for complete search history.

(56) References Cited

U.S. PATENT DOCUMENTS 4,371,307 A 2/1983 Mattson
4,574,417 A * 3/1986 Magnasco ............... A47L 13/08 15/236.05
11,161,154 B2 * 11/2021 Wilkerson ................ B08B 1/20
2003/0150627 A1 * 8/2003 Timmons ................. A01B 1/02 172/377
2020/0238956 A1 7/2020 Wilkerson

FOREIGN PATENT DOCUMENTS

CN 209271956 U 8/2019

OTHER PUBLICATIONS

International Search Report and Written Opinion on PCT/US2023/080998 dated Mar. 14, 2024.

* cited by examiner

*Primary Examiner* — Nathaniel E Wiehe
*Assistant Examiner* — Jason G Davis
(74) *Attorney, Agent, or Firm* — Foley & Lardner LLP

(57) ABSTRACT

A bucket cleaning device comprises a base section having a first base member, a second base member, and at least one connecting member, extending between the first base member and the second base member. A bucket cleaning device also includes a scraping support member extending from the base section, the scraping support member having a front end and a rear end. A bucket cleaning device further includes a front scraping member coupled to the front end of the scraping support member at a front scraping angle relative to the scraping support member. A bucket cleaning device also includes a rear scraping member coupled to the rear end of the scraping support member by a height and at a rear scraping angle relative to the scraping support member.

20 Claims, 5 Drawing Sheets

BUCKET CLEANING SYSTEM

CROSS-REFERENCE TO RELATED PATENT APPLICATIONS

This application is a U.S. non-Provisional Patent application which claims priority to and the benefit of U.S. Provisional Patent Application No. 63/428,333, filed Nov. 28, 2022, the entirety of which is incorporated by reference herein in its entirety.

BACKGROUND

During construction operations, a frequent issue arises concerning the accumulation of mud, dirt, clay, rock, snow, asphalt, and various debris on the interior surfaces of buckets attached to construction equipment, for example, excavators and loaders. Over time, these materials adhering to the inner surfaces of the bucket lead to a progressive decrease in the bucket's internal usable volume. Consequently, the operation of such equipment must be halted to facilitate the cleaning of the bucket's interior, thereby restoring the bucket back to its full capacity. The cleaning process is a labor-intensive endeavor, necessitating one or more individuals to manually scrape off the accumulated mud or dirt. During this cleaning period, the equipment remains inoperative, adding to the overall time and cost of a projects completion. In some cases, when cleaning the bucket becomes increasingly frequent or the debris buildup reaches a certain critical level, operating the equipment at a job site becomes economically unviable due to the escalation of fuel and labor costs. In severe situations, it may even force the cessation of operations at the job site.

SUMMARY OF THE INVENTION

According to a first aspect, a bucket cleaning device includes a base section having a first base member, a second base member, and at least one connecting member, extending between the first base member and the second base member. A bucket cleaning device also includes a scraping support member extending from the base section, the scraping support member having a front end and a rear end. A bucket cleaning device further includes a front scraping member coupled to the front end of the scraping support member at a front scraping angle relative to the scraping support member. A bucket cleaning device also includes a rear scraping member coupled to the rear end of the scraping support member by a height and at a rear scraping angle relative to the scraping support member.

According to other embodiments, the front scraping angle is equal to the rear scraping angle.

In many embodiments, the rear scraping angle is greater than the front scraping angle.

According to some embodiments, the first base member further includes an opening and the at least one connecting member is positioned about the opening of the first base member.

In other embodiments, the opening in the first base member is a first opening and the second base member further includes a second opening, the first and second openings configured to receive the forks of a forklift.

According to many embodiments, a bucket cleaning system further includes a tow hook member secured to the base section.

In some other embodiments, a rear end of the first base member is chamfered.

According to some embodiments, the rear scraping member is removably coupled to the scraping support member with at least one fastener.

In other embodiments, the front scraping member is welded to the scraping support member.

According to a second aspect, a bucket cleaning system includes a base having a pair of base members and at least one connecting member extending between the pair of base members. The bucket cleaning system further includes a pair of upright members, each upright member extending from a respective base member of the pair of base members. The bucket cleaning system also includes, a scraping member coupled to the pair of upright members, the scraping member having a front scraping edge and a rear scraping edge. The bucket cleaning system further includes, wherein the front scraping edge is formed at a front angle relative to a top surface of the scraping member and the rear scraping edge is formed at a rear angle relative to the top surface of the scraping member.

According to some embodiments, the front angle is equal to the rear angle.

In many embodiments, the rear angle is greater than the front angle.

According to other embodiments, the pair of base members include a pair of aligned openings, the aligned openings configured to receive the forks of a forklift.

In other embodiments, the at least one connecting member is a pair of connecting members, wherein each connecting member is positioned about a respective aligned opening.

According to many embodiments, the rear scraping edge is removably coupled to the scraping member.

In many other embodiments, the front scraping edge has a front scraping edge width that is at least about a scraping member width of the scraping member.

According to a third aspect, a method of making a bucket cleaning device includes the step of providing a base section having a first base member, a second base member, and at least one connecting member extending between the first base member and the second base member. The method further includes the step of connecting a bottom end of the scraping support member to the base section, the scraping support member having a top end with a front edge and a rear edge. The method further includes the step of coupling a front scraping member to the front edge of the scraping support member at a front scraping angle relative to the scraping support member. The method further also the step of coupling a rear scraping member to the rear edge of the scraping support member at a rear scraping angle relative to the scraping support member.

According to some embodiments, coupling the front scraping member to the front edge of the scraping support member includes welding a portion of the front scraping member to the front edge of the scraping support member.

In some other embodiments, coupling the rear scraping member to the rear edge of the scraping support member includes removably coupling the rear scraping member to the rear edge of the scraping support member with a plurality of fasteners.

According to other embodiments, the method further includes forming a pair of opening in the first base member, the pair of openings configured to receive the forks of a forklift.

BRIEF DESCRIPTION OF THE DRAWINGS

The disclosure will become more fully understood from the following detailed description, taken in conjunction with the accompanying figures, wherein like reference numerals refer to like elements, in which.

The drawings are not necessarily to scale and certain features may be shown exaggerated in scale or in somewhat schematic form in the interest of clarity and conciseness.

DETAILED DESCRIPTION

Figure 1:
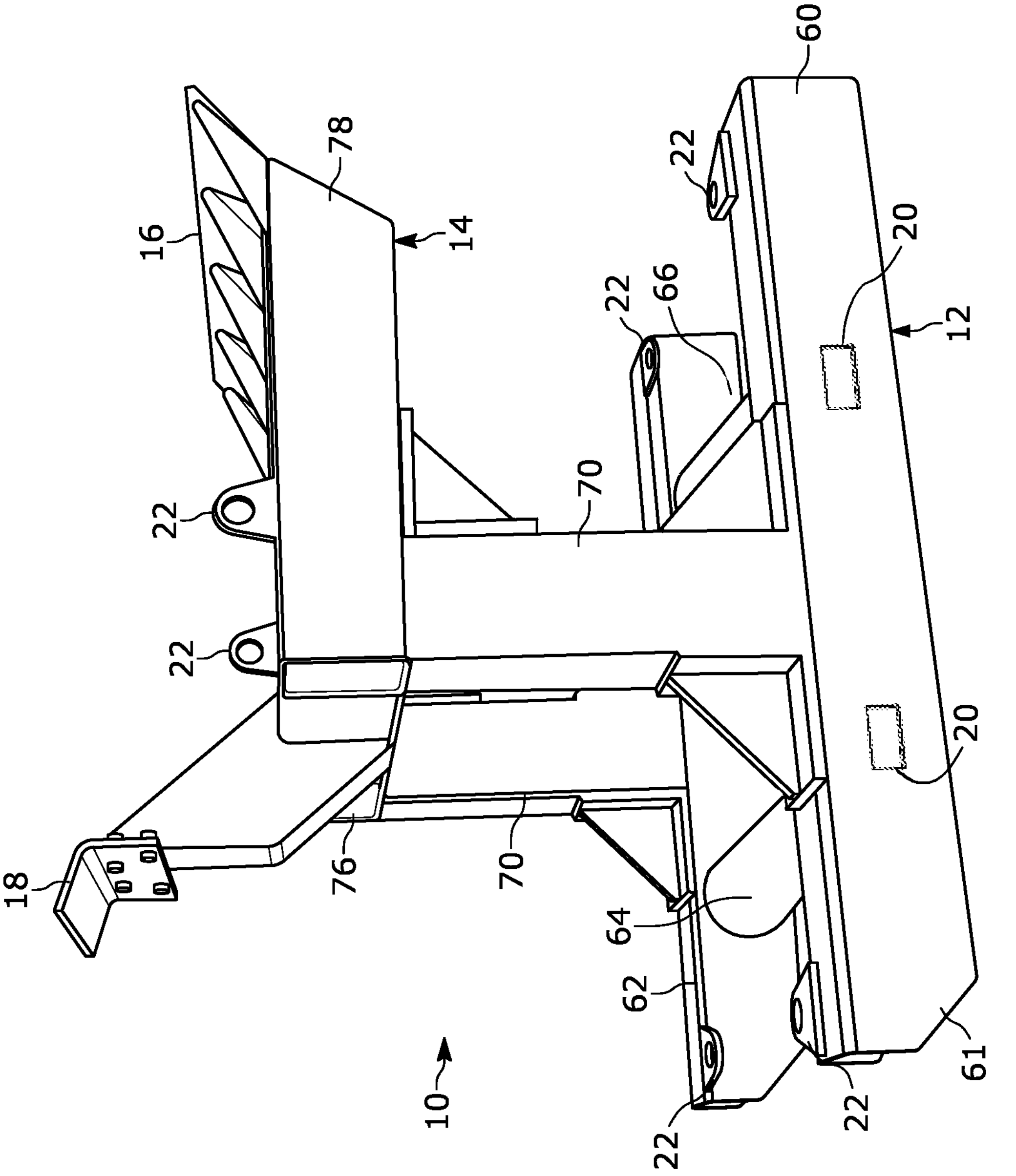
FIG. 1 illustrates a side perspective view of a bucket cleaning system.

FIG. 1 illustrates an embodiment of a bucket cleaning system 10 configured to be used to, as explained in greater detail below, scrape and clean the interior area 52 of a bucket 50 on equipment such as, for example, excavators, backhoes and wheel and track loaders. In the embodiment illustrated in FIG. 1, the bucket cleaning system 10 includes a base section 12, an upright section 14 secured to and extending from the base section 12, front scraping blade 16, and rear scraping blade 18. Both the front scraping blade 16 and the rear scraping blade 18 are coupled to the upright section 14. In use and as explained in greater detail below, a bucket 50 or other device to be cleaned, is aligned with and lowered onto either the front scraping blade 16 or the rear scraping blade 18 such that the bucket 50 contacts the respective scraping blade 16, 18. The bucket 50 is then moved relative to the scraping blade 16 or 18 to scrape or otherwise remove accumulated debris 53 from the interior 52 of the bucket 50, as illustrated, for example, in FIGS. 3-4.

Continuing with reference to FIG. 1, the base section 12 is formed having longitudinal members 60, 62, and connecting members 64, 66 extending between and connecting the longitudinal members 60, 62. According to some embodiments, the longitudinal members 60, 62 and connecting members 64 and 66 may be formed of steel rods and/or beams and/or a combination thereof. According to some embodiments, the base section 12 can be constructed with a plurality of metal tubes or members utilizing any cross-sectional shape to form a skid-like structure. It should be understood that the longitudinal members 60, 62, and connecting members 64, 66 may be formed of any suitable material. In the embodiments depicted in FIGS. 1-4, the rear ends of the longitudinal members 60, 62 can be eased or chamfered to allow for towing operations to be performed more efficiently. It should be understood that while only a single end of the of the longitudinal members 60, 62 is depicted as eased or chamfered, other embodiments are also envisioned. For example, both ends of the longitudinal members 60, 62 can be eased or chamfered to facilitate towing operations in either the front direction or the rear direction.

The base 12 also includes a pair of openings 20 and tow eyes 22. The openings 20 are sized and shaped to accept forks of a forklift. The forks on the forklift can be inserted through the openings 20 to pick up and move the system 10 from one location to another on a jobsite or for loading and unloading of the system 10 to and from a trailer or the like. The tow eyes 22 are positioned about the base 12 such that the system 10 can be towed and or dragged from one location on the job-site to another. In many embodiments, the system 10 can be towed behind an excavator during excavation operations to minimize the distance between the bucket 50 and the cleaning system 10. In the embodiment illustrated in FIGS. 1 and 2, the connecting members 64 and 66, in addition to providing stability to the system 10, and in particular, to resist relative movement of longitudinal members 60, 62, are hollow and aligned with the openings 20 so as to receive the forks from a forklift.

Figure 2:
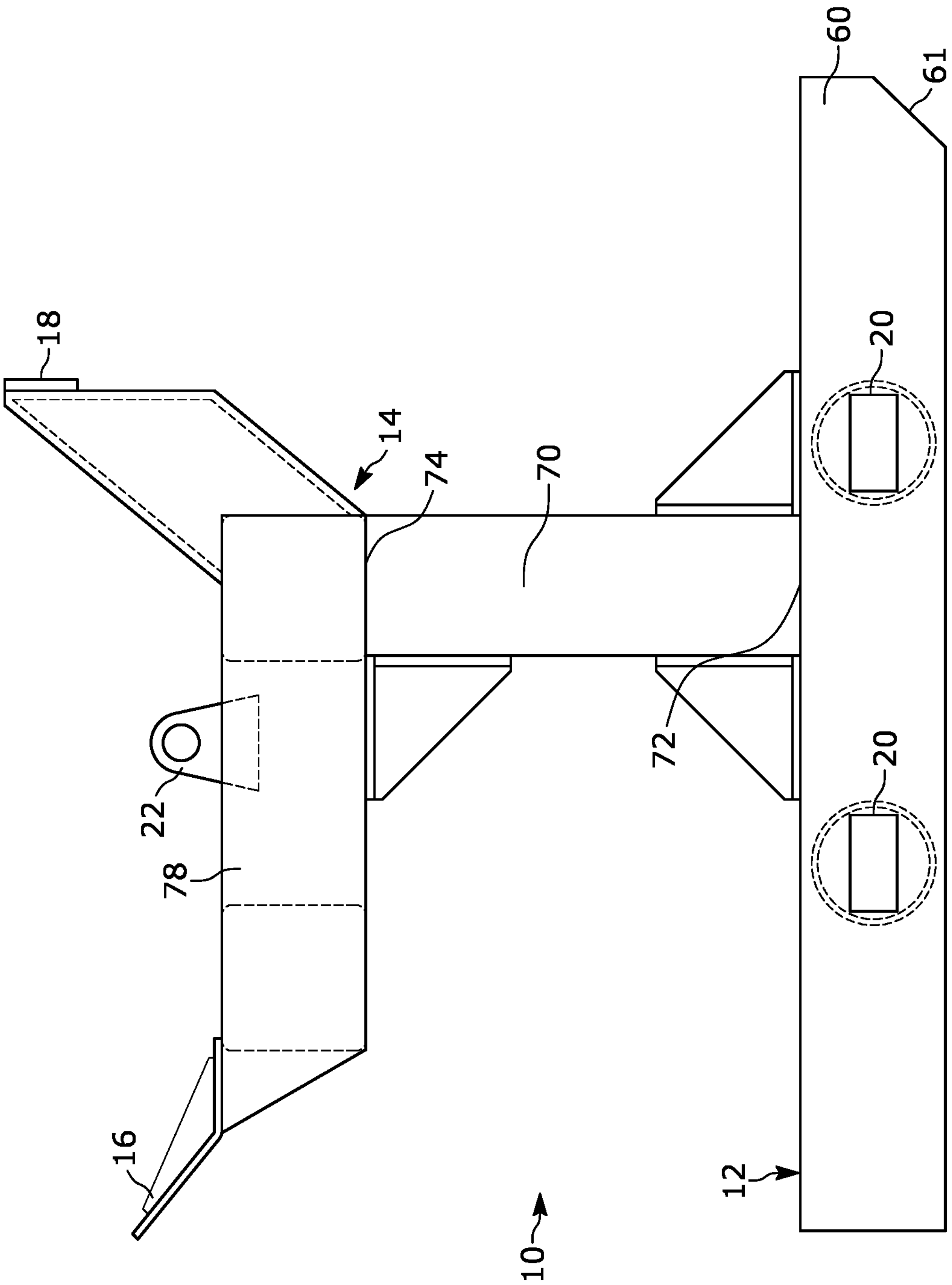
FIG. 2 illustrates a side plan view of an embodiment of a bucket cleaning system.
Figure 4:
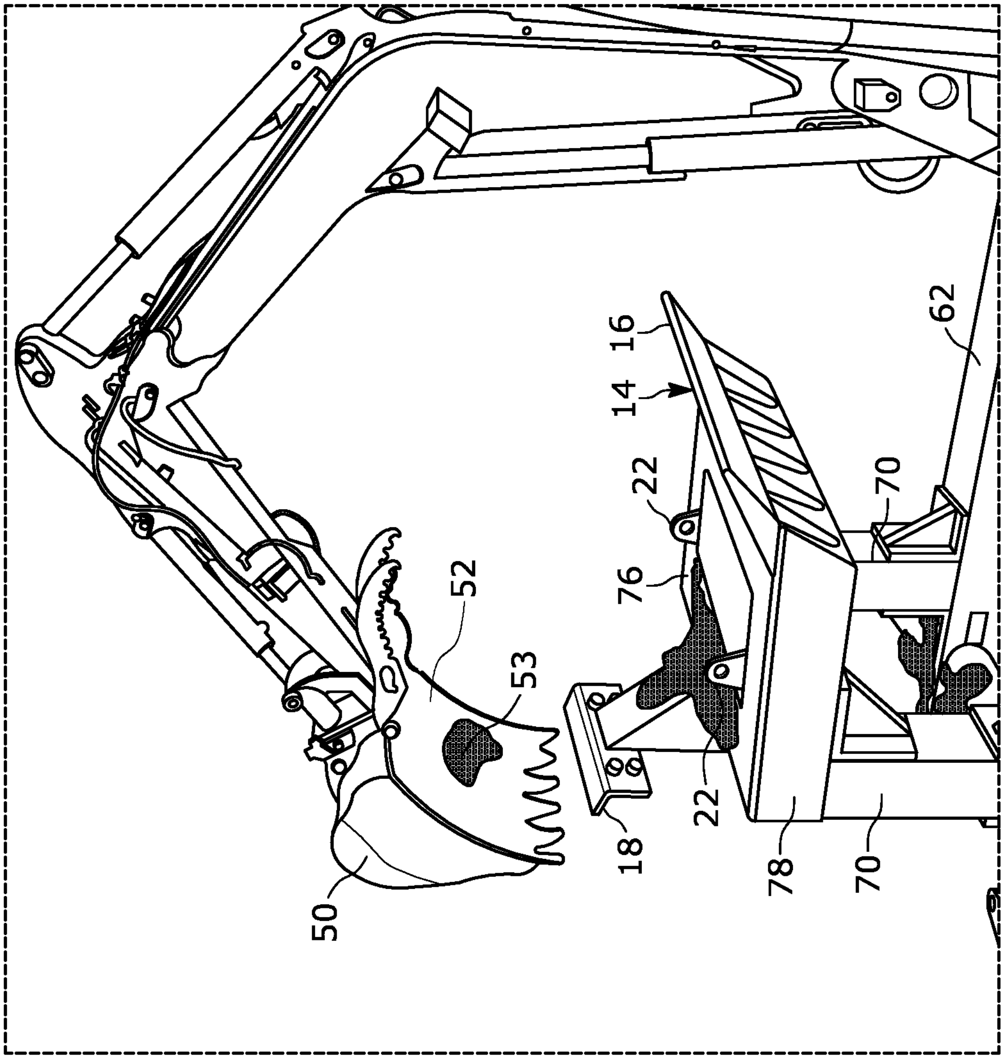
FIG. 4 illustrates a side perspective view of a bucket cleaning system with a backhoe bucket positioned to utilize scraping blade 18.

With continued reference to FIGS. 1 and 2, the upright section 14 (also referred to as a scraping support member or a support member) includes a pair of upright supports 70, each having a first or bottom end 72 and a second or top end 74. The upright supports 70 are secured to the base 12 at their respective bottom ends 72. As illustrated in FIGS. 1 and 4, horizontal support members 76, 78 extend from the upright supports 70 at their respective top ends 74. The horizontal support members 76, 78 are configured to support the front scraping blade 16 on the front end of the upright section 14 and the rear scraping blade 18 on the rear end of the upright section 14. In some embodiments, the upright section 14 also includes tow eyes 22 affixed to or otherwise coupled to the upright section 14 to facilitate the system 10 being transported from one location to another or loaded onto a trailer.

Additionally, while FIGS. 1 and 2 depict that the upright support 70 extends generally vertically, it should be understood that any angular configuration may be used. Likewise, the horizontal support members 76, 78 may also be positioned otherwise from horizontal to any desired angular configuration. Moreover, while FIGS. 1 and 2 depict that the system 10 includes two connecting members 64, 66, it should be understood that a greater or fewer number of connecting members 64 and 66 may be utilized and may be positioned in any suitable configuration.

With continued reference to FIG. 1, front scraping blade 16 is positioned about the front end of the upright section 14. The front scraping blade 16 is sized and shaped to maximize contact with the interior 52 surface of the bucket 50 while maximizing its scraping effectiveness. As shown in FIG. 2, the front scraping blade 16 extends out from the upright section 14 at an angle relative to the top surface of the upright section 14. In some embodiments, the front scraping blade 16 is set at a forty-five degree angle relative to the top surface of the upright section 14. It should be understood, that while the front scraping blade 16 extends at an angle, any configuration or orientation may be utilized. For example, the front scraping blade 16 can have a curved profile or any other suitable profile. The front scraping blade 16 can be coupled or otherwise connected to the upright section 14 by a permanent connection such as welding or by a removable connection such as fasteners. With embodiments that utilize removable connections, the front scraping blade 16 can be replaced quickly in the event that the installed front scraping blade 16 breaks.

Figure 3:
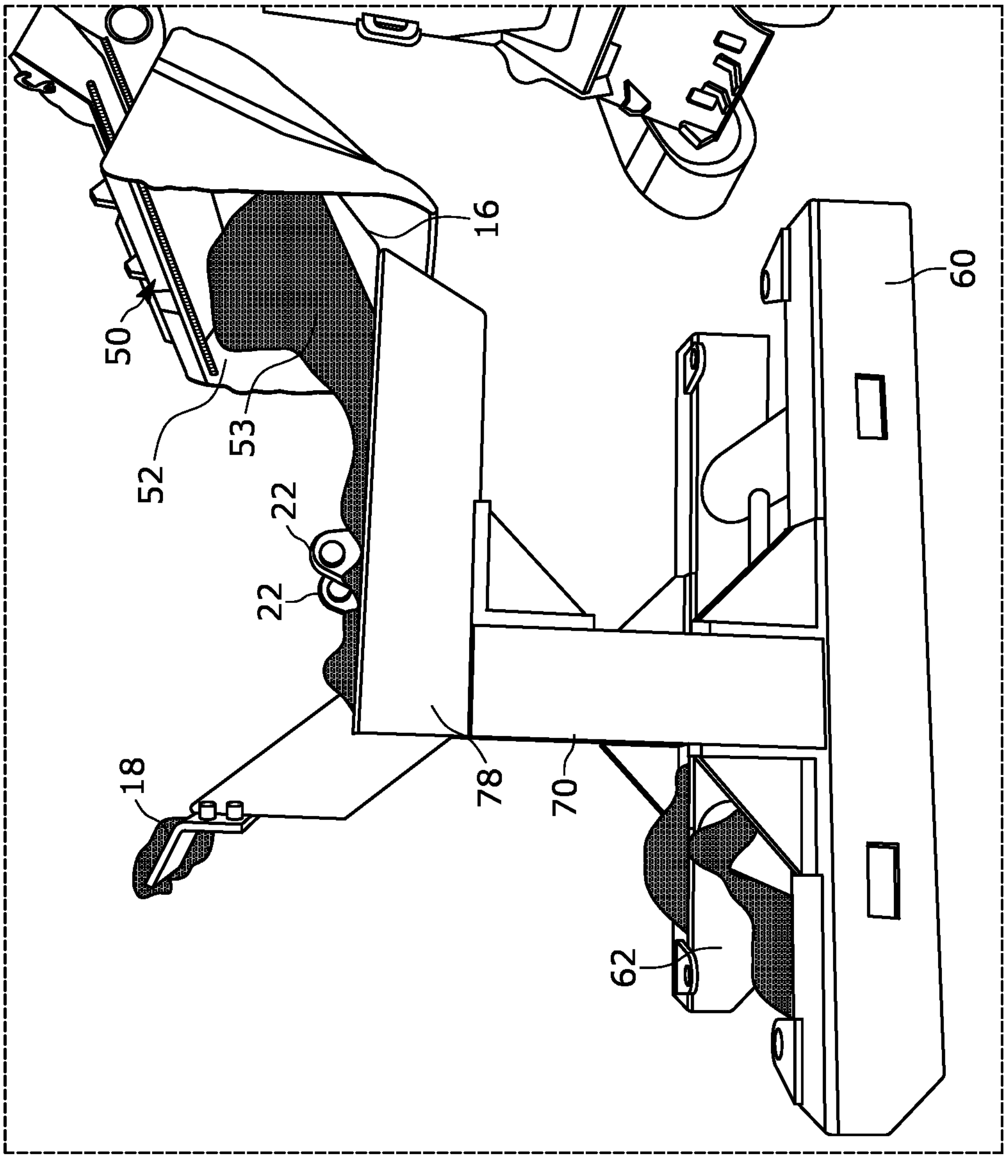
FIG. 3 illustrates a side perspective view of a bucket cleaning system with a bucket positioned to utilize front scraping blade 16.

Reference is now made to FIG. 3, which illustrates a side perspective of the front scraping blade 16 of the bucket cleaning system 10 being utilized. During cleaning operations that utilize the front scraping blade 16, the line of sight for the equipment operator into the interior 52 of the bucket 50 is largely obstructed. In this manner, the equipment operator lines up the leading edge of the bucket 50 with the front scraping blade 16 such that the leading edge of the bucket 50 contacts the front scraping blade 16. Then, the equipment operator proceeds to move the bucket 50 along the front scraping blade 16 until the front scraping blade 16 contacts the rear edge of the interior 52 of the bucket 50. When used this configuration, the front scraping blade 16 is configured to remove the debris 53 accumulating within and onto the interior surfaces 52 of the bucket 50.

Reference is again made to FIGS. 1 and 2, the rear scraping blade 18 is positioned about the rear end of the upright section 14. The rear scraping blade 18 is sized and shaped to maximize contact with the interior 52 surface of the bucket 50 while maximizing its scraping effectiveness. As shown in FIG. 2, the rear scraping blade 18 extends out from the upright section 14 at an angle relative to the top surface of the upright section 14. In many embodiments, the rear scraping blade 18 is set at a 90-degree angle relative to the top surface of the upright section 14. It should be understood, that while the rear scraping blade 18 extends at an angle, any configuration or orientation may be utilized. For example, the rear scraping blade 18 can have a curved profile or any other suitable profile. The rear scraping blade 18 can be coupled or otherwise connected to the upright section 14 by a permanent connection such as welding or by a removable connection such as fasteners. With embodiments that utilize removable connections, the rear scraping blade 18 can be replaced quickly in the event that the installed rear scraping blade 18 breaks.

Reference is now made to FIG. 4, which illustrates a side perspective of the rear scraping blade 18 of the bucket cleaning system 10 utilized for cleaning operations. When utilizing the rear scraping blade 18, the bucket 50 is positioned adjacent the bucket cleaning system 10 and in the example illustrated in FIG. 4, an excavator has its boom extended such that the bucket 50 is generally positioned above the rear scraping blade 18 with the interior 52 of the bucket 50 facing toward the rear scraping blade 18. The excavator bucket 50 is then lowered onto the rear scraping blade 18 until the leading edge of the interior 52 of the bucket 50 contacts the rear scraping blade 18 and then the bucket 50 is moved relative to the rear scraping blade 18 to scrape mud and dirt from the interior 52 of the bucket 50, as illustrated, for example, in FIG. 4.

Positioning the rear scraping blade 18 opposite of the front scraping blade 16 allows for the equipment operator, for example an excavator operator, to have a more complete view of the interior 52 of the bucket 50 during cleaning operations when the operator utilizes the rear scraping blade 18 for cleaning operations but approaches the front end of the upright section 14. In this manner, the equipment operator can more precisely scrape the construction debris 53 from the interior surfaces 52 of the bucket 50. This functionality is particularly useful when the construction debris 53 has adhered to the interior surface 52 of the bucket 50 in a manner such that attempts to utilize the front scraping blade 16 to remove the construction debris 53 does not efficiently remove the construction debris 53 from the interior surface 52 of the bucket 50.

While the embodiments illustrated in FIGS. 1-4 utilize both a front scraping blade 16 and a rear scraping blade 18, it should be understood that other embodiments are also envisioned. For example, a bucket cleaning system 10 can have either a front scraping blade 16 only or a rear scraping blade 18 only. However, incorporating both the rear scraping blade 18 and the front scraping blade 16 as shown in FIG. 4 allows for various types of equipment and machinery to utilize the bucket cleaning system 10 that otherwise could not utilize the front scraping blade 16. Moreover, it should be understood that while the front scraping blade 16 and the rear scraping blade 18 are depicted as being positioned on opposite ends of the bucket cleaning system 10 in FIGS. 1-4, other embodiments are also envisioned. For example, the front scraping blade 16 maybe positioned on the front end of the upright section 14, while the rear scraping blade 18 is positioned along one of the sides of the upright section 14 that are perpendicular to the front end of the upright section 14, and vice versa. another example includes a pair of front scraping blades 16 and rear scraping blades 18, where each respective scraping blade 16, 18 is positioned about each of the four sides of the upright section 14. For embodiments such as this, there can be multiple equipment operators cleaning their respective buckets 50 simultaneously.

The angle of the front scraping blade 16 relative to the top surface of the upright section 14 can be the same as the angle of the rear scraping blade 18 relative to the top surface of the upright section 14. It should be understood, that the angle of the front scraping blade 16 relative to the top surface of the upright section 14 can also be greater than or less than the angle of the rear scraping blade 18 relative to the top surface of the upright section 14. In many embodiments, the angles of the front scraping blade 16 and the rear scraping blade 18 are different from one another to facilitate or accommodate for various shapes and sizes of the interior surfaces 52 of various buckets 50 that may be present at a job site at any particular time. However, any combination of angles for the front scraping blade 16 and the rear scraping blade 18 relative to the top surface of the upright section 14 can be utilized.

Figure 5:
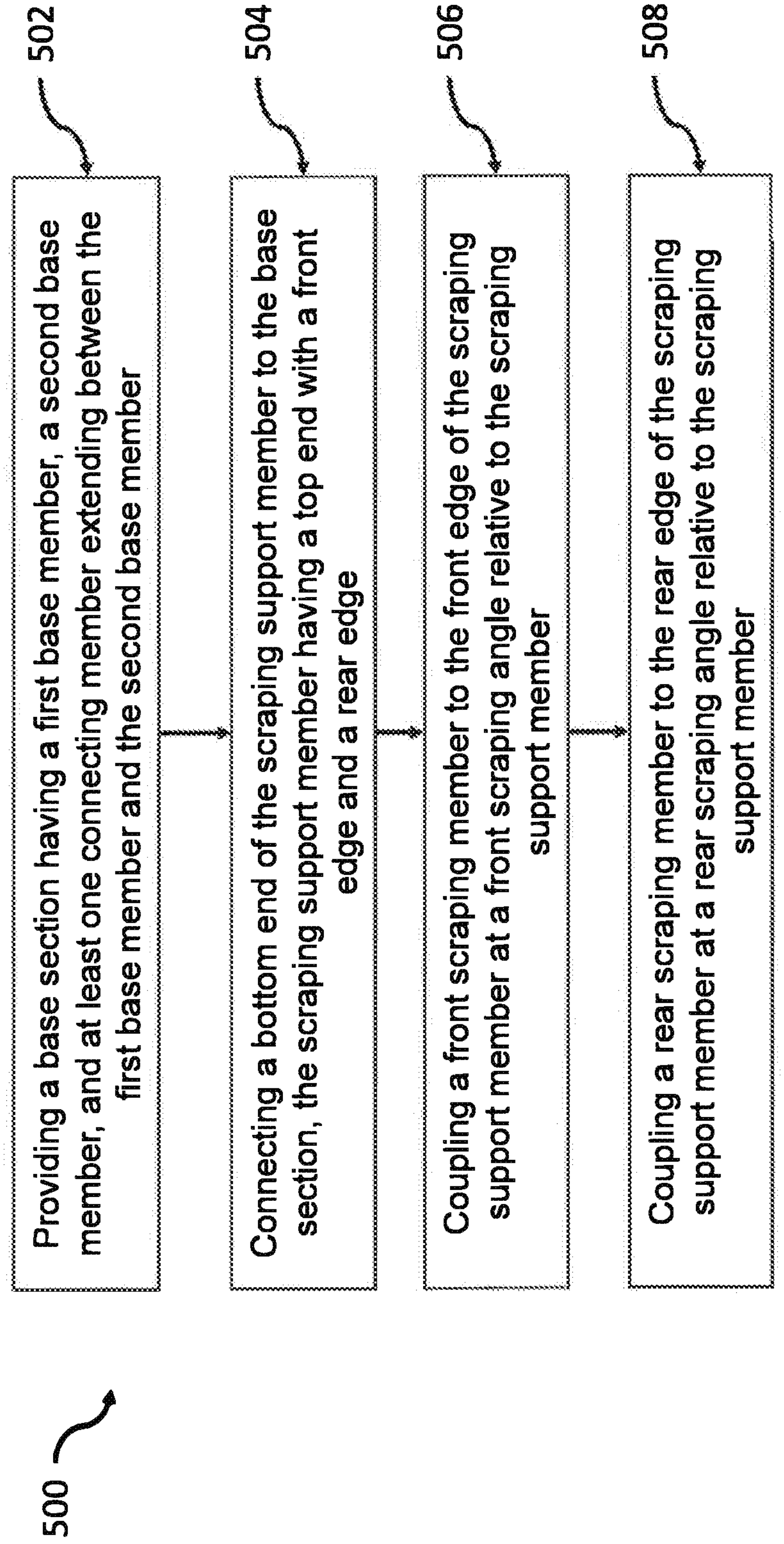
FIG. 5 illustrates a flow chart for a method 500 of making a bucket cleaning system 10.

Reference is now made to FIG. 5, which illustrates a flow chart for a method 500 of making a bucket cleaning system 10. The method 500 begins at step 502, with the step of providing a base section 12 having a first base member 60, a second base member 62, and at least one connecting member 64 extending between the first base member 60 and the second base member 62. The method 500 continues at step 504, with the step of connecting a bottom end of the scraping support member to the base section 12, the scraping support member having a top end with a front edge and a rear edge. The method 500 continues at step 506, with the step of coupling a front scraping member to the front edge of the scraping support member at a front scraping angle relative to the scraping support member. The method 500 concludes at step 508 with the step of coupling a rear scraping member to the rear edge of the scraping support member at a rear scraping angle relative to the scraping support member.

Although embodiments of a bucket cleaning system 10 have been described in detail, those skilled in the art will also recognize that various substitutions and modifications may be made without departing from the scope and spirit of the appended claims.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as “left” and right”, “front” and “rear”, “above” and “below” and the like are used as words of convenience to provide reference points and are not to be construed as limiting terms.

In this specification, the word “comprising” is to be understood in its “open” sense, that is, in the sense of “including”, and thus not limited to its “closed” sense, that is the sense of “consisting only of”. A corresponding meaning is to be attributed to the corresponding words “comprise”, “comprised” and “comprises” where they appear.

In addition, the foregoing describes some embodiments of the disclosure, and alterations, modifications, additions and/or changes can be made thereto without departing from the scope and spirit of the disclosed embodiments, the embodiments being illustrative and not restrictive.

Furthermore, the disclosure is not to be limited to the illustrated implementations, but to the contrary, is intended to cover various modifications and equivalent arrangements included within the spirit and scope of the disclosure. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A bucket cleaning device comprising:

a skid base section having a first elongated longitudinal base member, a second elongated longitudinal base member parallel to the first elongated longitudinal base member, and at least one connecting member extending transversely between the first elongated longitudinal base member and the second elongated longitudinal base member, wherein lower surfaces of the first and second elongated longitudinal base members define ground-engaging skid surfaces configured to support the bucket cleaning device for movement along a worksite surface;

a scraping support member extending from the base section, the scraping support member having a front end and a rear end, the scraping support member configured to support a front scraping member at the front end and a second scraping member at the second end;

the front scraping member coupled to the front end at a front scraping angle relative to the scraping support member; and the rear scraping member coupled to the rear end at a rear scraping angle relative to the scraping support member.

2. The bucket cleaning device of claim 1, wherein the front scraping angle is equal to the rear scraping angle.

3. The bucket cleaning device of claim 1, wherein the rear scraping angle is greater than the front scraping angle.

4. The bucket cleaning device of claim 1, wherein the first base member further includes an opening and the at least one connecting member is positioned about the opening of the first base member.

5. The bucket cleaning device of claim 4, wherein the opening in the first base member is a first opening and the second base member further includes a second opening, the first and second openings configured to receive the forks of a forklift.

6. The bucket cleaning device of claim 1, further comprising a tow hook member secured to the base section.

7. The bucket cleaning device of claim 1, wherein an end of the first base member is chamfered.

8. The bucket cleaning device of claim 1, wherein the rear scraping member is removably coupled to the scraping support member with at least one fastener.

9. The bucket cleaning device of claim 1, wherein the front scraping member is welded to the scraping support member.

10. A bucket cleaning system, the system comprising:

a skid base section having a pair of parallel extending base members and at least one connecting member extending transversely between the pair of base members, wherein lower surfaces of the base members define ground-engaging skid surfaces configured to support the bucket cleaning device for movement along a worksite surface;

a pair of upright members, each upright member extending from a respective base member of the pair of base members;

a scraping member coupled to the pair of upright members, the scraping member having a front scraping edge and a rear scraping edge; and wherein the front scraping edge is formed at a front angle relative to a top surface of the scraping member and the rear scraping edge is formed at a rear angle relative to the top surface of the scraping member.

11. The system of claim 10, wherein the front angle is equal to the rear angle.

12. The system of claim 10, wherein the rear angle is greater than the front angle.

13. The system of claim 10, wherein the pair of base members include a pair of aligned openings, the pair of aligned openings configured to receive the forks of a forklift.

14. The system of claim 13, wherein the at least one connecting member is a pair of connecting members, wherein each connecting member is positioned about a respective aligned opening.

15. The system of claim 10, wherein the rear scraping edge is removably coupled to the scraping member.

16. The system of claim 10, wherein the front scraping edge has a front scraping edge width that is at least about a scraping member width of the scraping member.

17. A method of making a bucket cleaning device, the method comprising:

providing a skid base section having a first longitudinally extending base member, a second and parallel longitudinally extending base member, and at least one connecting member extending transversely between the first base member and the second base member;

connecting a bottom end of a scraping support member to the base section, the scraping support member having a top end with a front edge and a rear edge;

coupling a front scraping member to the front edge of the scraping support member at a front scraping angle relative to the scraping support member; and coupling a rear scraping member to the rear edge of the scraping support member at a rear scraping angle relative to the scraping support member.

18. The method of claim 17, wherein coupling the front scraping member to the front edge of the scraping support member includes welding a portion of the front scraping member to the front edge of the scraping support member.

19. The method of claim 17, wherein coupling the rear scraping member to the rear edge of the scraping support member includes removably coupling the rear scraping member to the rear edge of the scraping support member with a plurality of fasteners.

20. The method of claim 17, further comprising forming a pair of openings in the first base member, the pair of openings configured to receive the forks of a forklift.

* * * * *